UNITED STATES PATENT OFFICE.

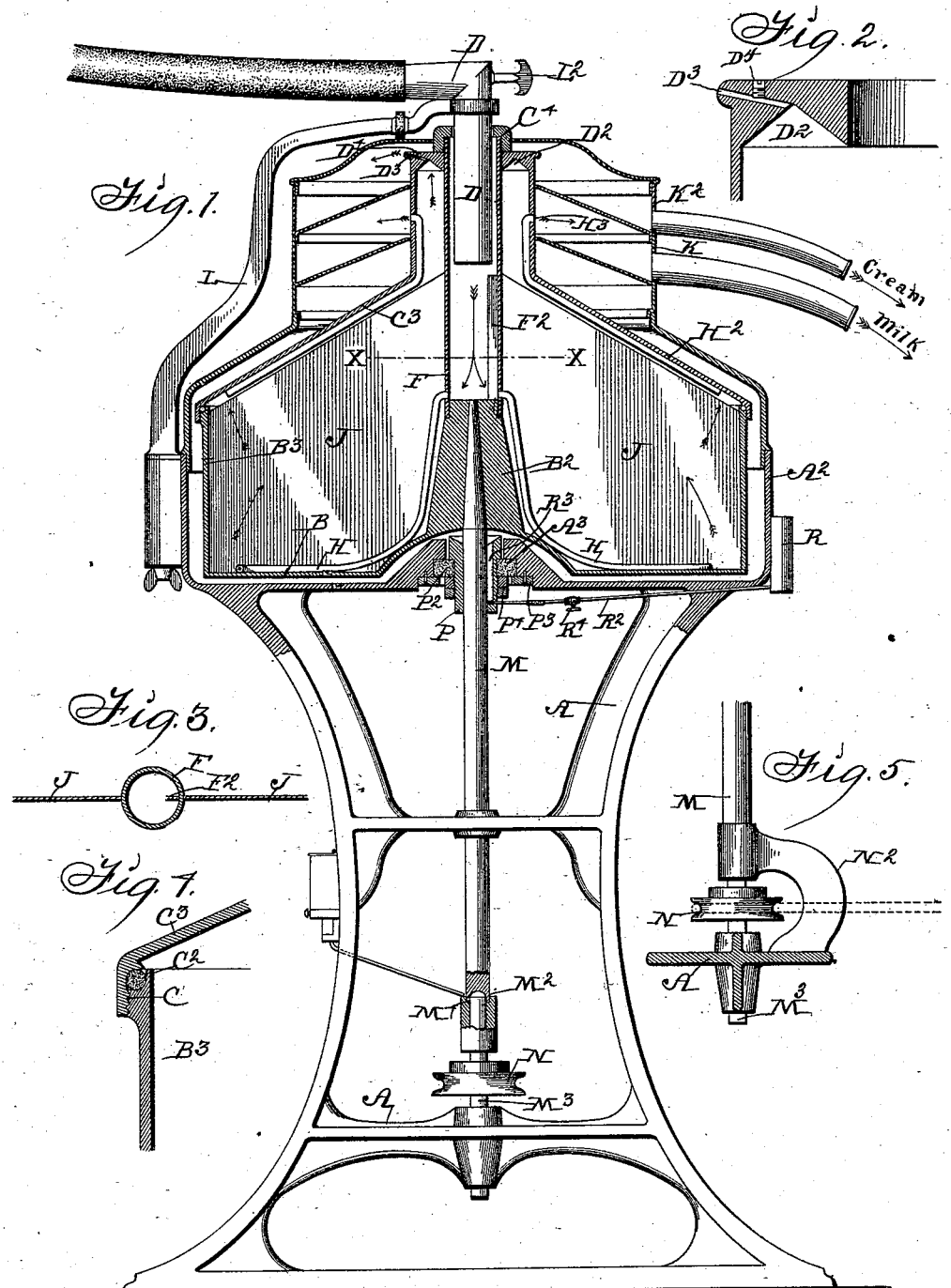

CLAUS HOHNSBEHN, OF WAVERLY, IOWA.

CENTRIFUGAL CREAM-SEPARATOR.

SPECIFICATION forming part of Letters Patent No. 534,367, dated February 19, 1895.

Application filed July 5, 1894. Serial No. 516,544. (No model.)

*To all whom it may concern:*

Be it known that I, CLAUS HOHNSBEHN, a citizen of the United States of America, residing at Waverly, in the county of Bremer and State of Iowa, have invented a Centrifugal Cream-Separator, of which the following is a specification.

The objects of my invention are, first, to provide a simple and durable separator which will extract a maximum of cream from a given quantity of milk, and further to construct the various parts of the device whereby a new belt may be applied to operate the separator without taking the complete machine apart, to provide a bowl from which the cream is readily discharged, to provide simple and durable means for lubricating the shaft, and further to provide a convenient, tight, durable and readily detachable connection between the upper and lower sections of the bowl.

My invention consists, first, in the construction of the bowl and the arrangement and combination of the wings therein, in the connection between the upper and lower sections of the bowl, in the construction of the top of the bowl whereby the cream is readily discharged, in the arrangement and combination of the lubricating mechanism and further in the general construction, arrangement and combination of the main shaft and accompanying parts whereby a new belt may be quickly and easily applied as hereinafter set forth, pointed out in my claims and illustrated in the accompanying drawings, in which—

Figure 1 is a vertical longitudinal sectional view of the complete device. Fig. 2 is a detail view showing the eduction port for the cream. Fig. 3 is a detail sectional view through the line $x$ $x$ of Fig. 1. Fig. 4 is a detail sectional view showing the construction between the upper and lower sections of the bowl. Fig. 5 is an enlarged detail view of the belt wheel shaft and accompanying parts.

Referring to the accompanying drawings the reference letter A is used to indicate the supporting frame preferably made of cast metal and having a bowl shaped top $A^2$ formed integral therewith having an opening in its central portion which is preferably enlarged at $A^3$.

The separating bowl is composed of a bottom B having an integral upward projection $B^2$ in the central portion and its bottom bowed upwardly to overlap the enlargement $A^3$. The sides $B^3$ of the separating bowl are of the same general contour as the bowl $A^2$ but somewhat smaller and at the top edge of the separating bowl is an enlarged externally screw-threaded portion C and a semi-circular recess $C^2$. The top $C^3$ of the separating bowl is inclined upwardly and inwardly and its top is flat and provided with an opening through which the supply pipe is passed and said opening has a cap $C^4$ adapted to closely fit the supply pipe F and the flat top of the bowl. The under surface of said top has an annular inverted V-shaped groove $D^2$ formed therein and a bore or cream eduction port $D^3$ leading outwardly therefrom with a set screw $D^4$ intercepting the bore whereby the flow therethrough may be regulated.

Fixed to the interior of the separating bowl is the supply pipe F with its lower edge engaging the projection $B^2$, and its top the cap $C^4$. A wing $F^2$ is fixed to one side of the pipe F so that the milk contained therein will be compelled to rotate with the pipe. Leading from the bottom of this pipe are a number of pipes H extending downwardly to the bottom of the separating bowl and then outwardly to a point near the outer end thereof, so that when rotated the milk will be forced downwardly and outwardly to a point near the outer edge of the bowl.

$H^2$ are pipes attached to the top of the bowl and leading from a point near the outer edge thereof inwardly and upwardly to a point $H^3$ at which they discharge outwardly.

J, J, indicate the partitions extending radially from the central pipe to the side of the bowl and from the bottom to a point near the top thereof completely dividing the bowl into two parts, so that, when rotated, all of the milk will be acted upon by centrifugal force and the water and heavier particles be taken from the outer edges of the interior of the bowl by the pipes $H^2$ and discharged into a milk receptacle or cover K of common construction placed on top of the bowl $A^2$ and the cream be discharged from the central portion of the separating bowl through the port $D^3$ into a cream receptacle or cover $K^2$ on top of the receptacle or cover K each of which is provided with a suitable discharge pipe.

The supply pipe to admit milk to the center of the bowl is supported by an arm L' detachably connected with the top A² of the frame, a cut off L² being provided whereby the flow may be regulated or stopped.

The separator bowl is adapted to be operated by means of power applied thereto through a belt, and I have so arranged the parts that the belt may be applied without separating its ends as follows:

M indicates the shaft fixed to the central portion of the separating bowl and extended straight downwardly therefrom through a bearing in the bottom of the part A² hereinafter described and terminating at M² with a concave end portion having a notch in its downwardly projecting flange. The lower section of the shaft indicated by the reference letter M⁴ is adapted to enter said concave portion and a key M⁴ projects outwardly therefrom adapted to enter the said notch so that both shafts will be rotated simultaneously and so that the upper shaft may be elevated at any time and be connected therewith by simply lowering it into contact with the under section. A belt wheel N is attached to said lower section and the union of the two ends of the shaft is protected by an arm N² fixed to the frame and encircling the ends.

P indicates a bearing block located in the bottom of the part A² of the frame having a concentric bore adapted to admit the shaft and permit its rotation or longitudinal movement. This block is provided with an annular shoulder adapted to engage the rubber packing ring P² which is held in place by the collar P³, the adjusting nuts P⁴ being provided to engage the outer surface of the block and also the packing ring so that said ring may be tightened at will. I have provided the following means for lubricating this bearing block:

R indicates an oil cup fixed to the frame R² a pipe leading from said cup to a slot R³ formed on the inner surface of the block and extending from a point near its bottom to its top. A cut off R⁴ is provided in said pipe whereby the flow of oil may be regulated. It will readily be seen that by this arrangement the oil in the slot will always be the same height as the oil in the cup and the shaft will continually run in oil.

In practical operation it will be seen that by having the partition in the separating bowl extend to the center thereof all of the milk will be rotated and the action of centrifugal force be applied to every particle within the bowl. It will be seen further that free access may be had to the interior of the bowl by removing the top thereof and further that a tight joint will be provided between said parts at all times by means of the packing ring.

The advantage gained by placing the packing ring around the edge of the bowl rather than in a groove formed in its top as has heretofore been done, is that a rubber packing ring may be used of a size smaller than the groove in which it is to rest and the ring stretched and put in place, while with the groove in the top the packing rings must accurately fit therein and when slightly expanded cannot be used.

The advantage of the method of applying the belt will be obvious, as will also the improved method of lubricating the shaft.

Having thus described my invention, what I claim as new therein, and desire to secure by Letters Patent of the United States therefor, is—

1. The combination in a centrifugal cream separator, comprising a suitable bowl, a pipe leading downwardly into its central portion, means for admitting milk into said pipe, a wing in said pipe projecting from its side inwardly to rotate the milk contained therein in unison with the bowl, and pipes leading downwardly from the interior of said central pipe to the outer bottom portion of the bowl, substantially as and for the purposes stated.

2. As an improved article of manufacture, a cylindrical bearing box for a centrifugal cream separator, having a central opening to admit a shaft, an annular outwardly projecting shoulder near its top and screw threaded on its exterior lower portion, a slot in the interior of the block extending parallel with the central opening and in communication therewith leading from its top to a point near its lower end and a tube section leading outwardly from the bottom of said slot, substantially as and for the purposes stated.

3. In a centrifugal cream separator, the combination of a suitable frame having a bowl shaped top portion with an opening in its under side having an annular shoulder therein, a vertical shaft extended through said opening, a yielding washer having a central opening placed in said opening in engagement with said shoulder, a cylindrical bearing box having a central bore and an outwardly extending annular shoulder adapted to engage the said yielding washer and screw threaded on its lower end, a washer having an internal screw thread adapted to engage the screw threaded portion of the bearing box and having its upper surface in engagement with the yielding washer, a slot leading from the inner top portion of the bearing box forwardly to a point near the lower end of same and in communication with the interior of the bearing box, and a tube leading from an oil supply tank to the bottom of said slot, substantially as and for the purposes stated.

CLAUS HOHNSBEHN.

Witnesses:
S. H. MORSE,
H. M. WOODFORD.